United States Patent
Bell et al.

(10) Patent No.: US 9,501,928 B1
(45) Date of Patent: Nov. 22, 2016

(54) UTILIZING SOCIAL MEDIA TO AFFECT ROAD TRAFFIC ROUTING

(71) Applicant: International Business Machines Corporation, Armonk, NY (US)

(72) Inventors: Mark Bell, Gournay en Bray (FR); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/938,359

(22) Filed: Nov. 11, 2015

(51) Int. Cl.
    *G01C 22/00* (2006.01)
    *G05D 1/00* (2006.01)
    *G08G 1/01* (2006.01)
    *H04L 29/08* (2006.01)

(52) U.S. Cl.
    CPC ............ *G08G 1/0125* (2013.01); *G08G 1/012* (2013.01); *G08G 1/0129* (2013.01); *G08G 1/0141* (2013.01); *H04L 67/18* (2013.01); *H04L 67/22* (2013.01); *H04L 67/26* (2013.01)

(58) Field of Classification Search
    CPC .. G08G 1/0129; G08G 1/0133; G08G 1/012; G08G 1/0141; H04L 51/32
    USPC .......................................................... 701/23
    See application file for complete search history.

(56) References Cited

U.S. PATENT DOCUMENTS

| | | | |
|---|---|---|---|
| 8,825,374 B2 | 9/2014 | Dimitriadis | |
| 9,212,921 B1* | 12/2015 | Sisbot et al. | |
| 9,212,925 B2* | 12/2015 | Bell et al. | |
| 2002/0121989 A1* | 9/2002 | Burns | 340/901 |
| 2007/0293958 A1* | 12/2007 | Stehle et al. | 700/30 |
| 2009/0319172 A1* | 12/2009 | Almeida et al. | 701/201 |
| 2010/0023256 A1* | 1/2010 | Trautenberg | 701/201 |
| 2010/0217515 A1* | 8/2010 | Arai et al. | 701/201 |
| 2011/0258260 A1 | 10/2011 | Isaacson | |
| 2013/0150087 A1* | 6/2013 | Kosuru et al. | 455/456.3 |
| 2014/0214832 A1* | 7/2014 | Nandakumar et al. | 707/737 |
| 2014/0222321 A1 | 8/2014 | Petty et al. | |
| 2014/0244770 A1* | 8/2014 | Kim et al. | 709/206 |
| 2014/0266800 A1* | 9/2014 | Koukoumidis et al. | 340/932.2 |
| 2014/0278031 A1* | 9/2014 | Scofield et al. | 701/118 |
| 2014/0278032 A1* | 9/2014 | Scofield | 701/118 |
| 2014/0337546 A1* | 11/2014 | Kitahama et al. | 710/73 |
| 2014/0358435 A1* | 12/2014 | Bell et al. | 701/527 |
| 2015/0035686 A1 | 2/2015 | Frish et al. | |
| 2015/0066341 A1* | 3/2015 | Von Holt | 701/117 |
| 2015/0095830 A1* | 4/2015 | Massoumi et al. | |
| 2015/0127388 A1* | 5/2015 | Oldham | 705/4 |
| 2015/0145696 A1* | 5/2015 | Seo et al. | 340/905 |

FOREIGN PATENT DOCUMENTS

CN 103778160 A 5/2014

OTHER PUBLICATIONS

Huzita et al. "A System to Capture and Generation of Traffic Information from Posted Messages on Social Networks"; 2012 Brazilian Symposium on Collaborative Systems; Oct. 2012.

* cited by examiner

*Primary Examiner* — Harry Oh
(74) *Attorney, Agent, or Firm* — Brown & Michaels, PC; John R. Pivnichny

(57) ABSTRACT

Using social media feeds to determine infrastructure and personal resolutions to high traffic events.

12 Claims, 5 Drawing Sheets

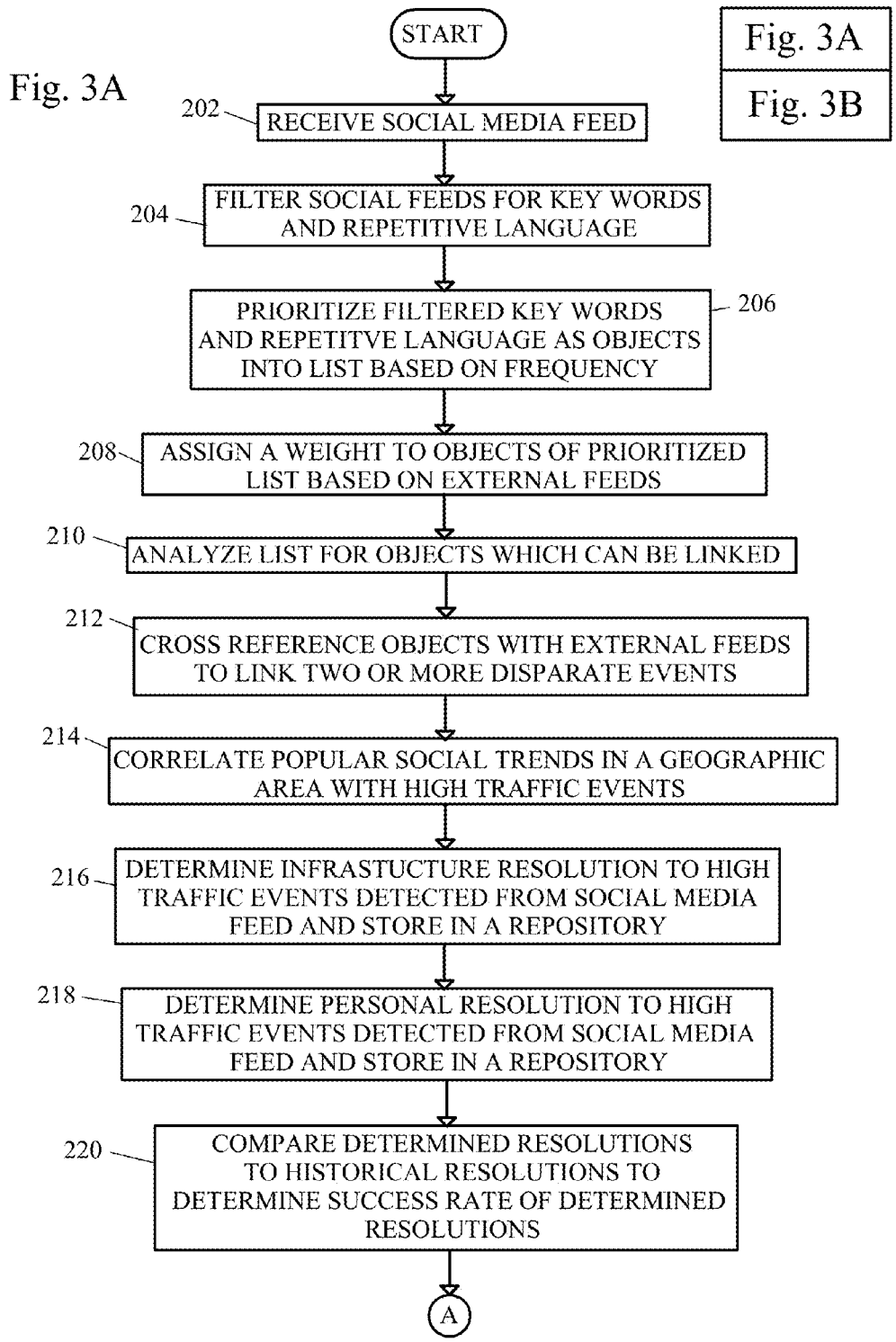

UTILIZING SOCIAL MEDIA TO AFFECT ROAD TRAFFIC ROUTING

BACKGROUND

The invention pertains to the field of traffic routing. More particularly, the invention pertains to utilizing social media feeds to determine infrastructure and personal resolutions to high traffic events.

Current solutions route traffic based on advanced formalized knowledge (used for government decisions) or existing conditions (used for both governmental and distributed decisions.

Examples of using advanced formalized knowledge for governmental decisions are: using knowledge of rush hour to open extra lanes, placing signs warning of road construction, and directing drivers to use alternate routes; and using knowledge of an event to likewise route non-attending drivers away from the event venue. Governmental decisions relate to infrastructure changes/resolutions.

Examples of using existing conditions for governmental decisions are: detection of real-time traffic slow-downs and warning drivers via overhead sign to take alternate routes.

Examples of using existing conditions for distributed conditions are: use of tools such as Waze to detect real-time slow-downs and distributing this information to routing devices so that current travel speeds can be factored into calculations.

In the above cases, traffic patterns are detected based on current conditions or predicted based on some set of known events.

SUMMARY

According to one embodiment of the present invention, a method of utilizing received social media feeds to determine infrastructure and personal resolutions to high traffic events is disclosed. The method comprising the steps of: a computer filtering social media feeds to retrieve keywords and repetitive language to correlate social trends in a geographic area with high traffic events; the computer prioritizing the filtered keywords and repetitive language as objects into a list based on a frequency of occurrence of the filtered keywords and repetitive language in the social media feeds; the computer assigning a weight to the objects on the list based on external feeds; the computer determining at least one of an infrastructure resolution and a personal resolution to the high traffic event; and the computer communicating the determined resolutions to the high traffic event to an external user.

According to another embodiment of the present invention, a computer program product for utilizing received social media feeds to determine infrastructure and personal resolutions to high traffic events, the computer program product comprising a computer comprising at least one processor, one or more memories, one or more computer readable storage media. The computer program product comprising a computer readable storage medium having program instructions embodied therewith. The program instructions executable by the computer to perform a method comprising: filtering, by the computer, social media feeds to retrieve keywords and repetitive language to correlate social trends in a geographic area with high traffic events; prioritizing, by the computer, the filtered keywords and repetitive language as objects into a list based on a frequency of occurrence of the filtered keywords and repetitive language in the social media feeds; assigning, by the computer, a weight to the objects on the list based on external feeds; determining, by the computer, at least one of an infrastructure resolution and a personal resolution to the high traffic event; and communicating, by the computer, the determined resolutions to the high traffic event to an external user.

According to another embodiment of the present invention, a computer system for utilizing received social media feeds to determine infrastructure and personal resolutions to high traffic events comprising a computer. The computer comprising at least one processor, one or more memories, one or more computer readable storage media having program instructions executable by the computer to perform the program instructions comprising: filtering, by the computer, social media feeds to retrieve keywords and repetitive language to correlate social trends in a geographic area with high traffic events; prioritizing, by the computer, the filtered keywords and repetitive language as objects into a list based on a frequency of occurrence of the filtered keywords and repetitive language in the social media feeds; assigning, by the computer, a weight to the objects on the list based on external feeds; determining, by the computer, at least one of an infrastructure resolution and a personal resolution to the high traffic event; and communicating, by the computer, the determined resolutions to the high traffic event to an external user.

BRIEF DESCRIPTION OF THE SEVERAL VIEWS OF THE DRAWINGS

FIG. 3A-3B shows a flow diagram of a method of utilizing social media feeds to determine infrastructure and personal resolutions to high traffic events.

DETAILED DESCRIPTION

Figure 1:
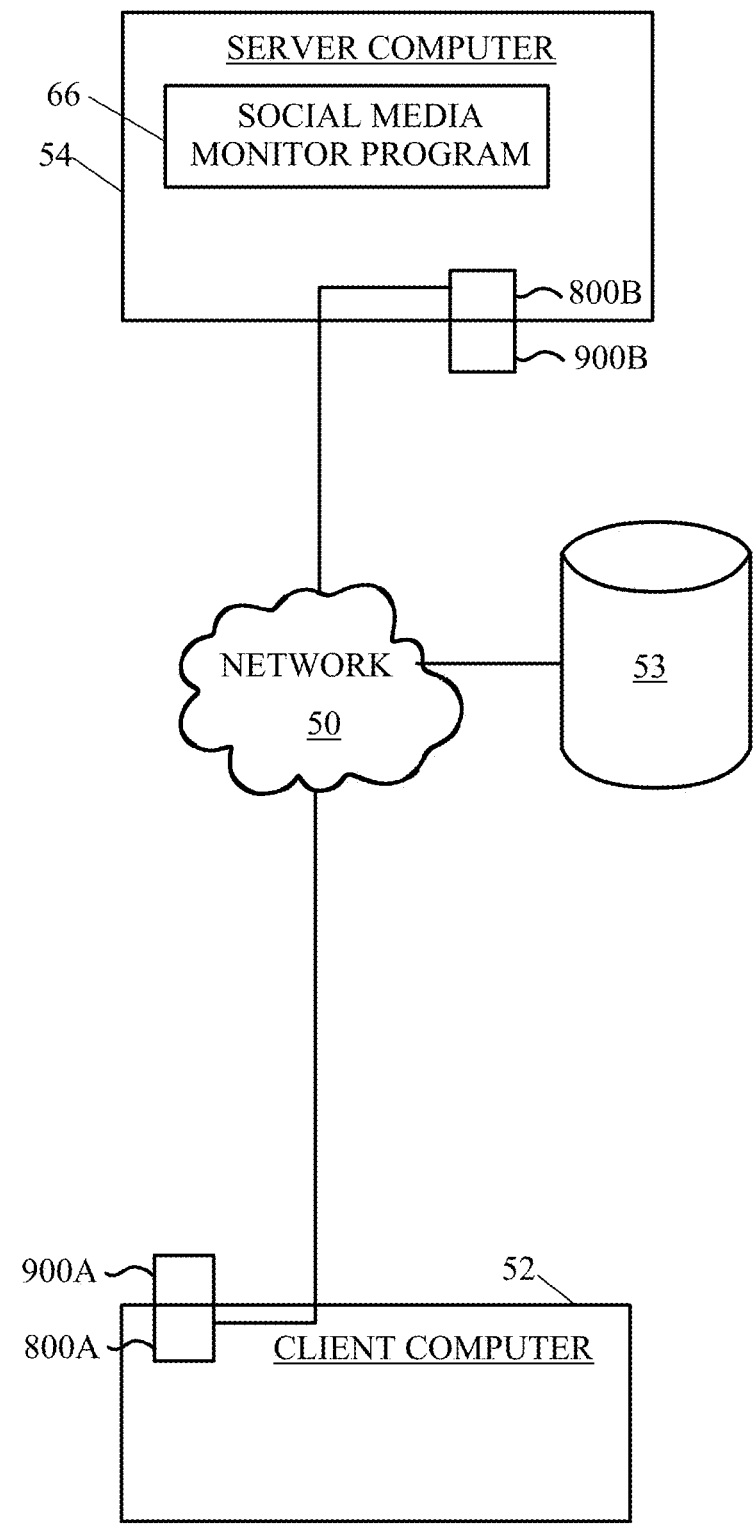
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown.

Figure 4:
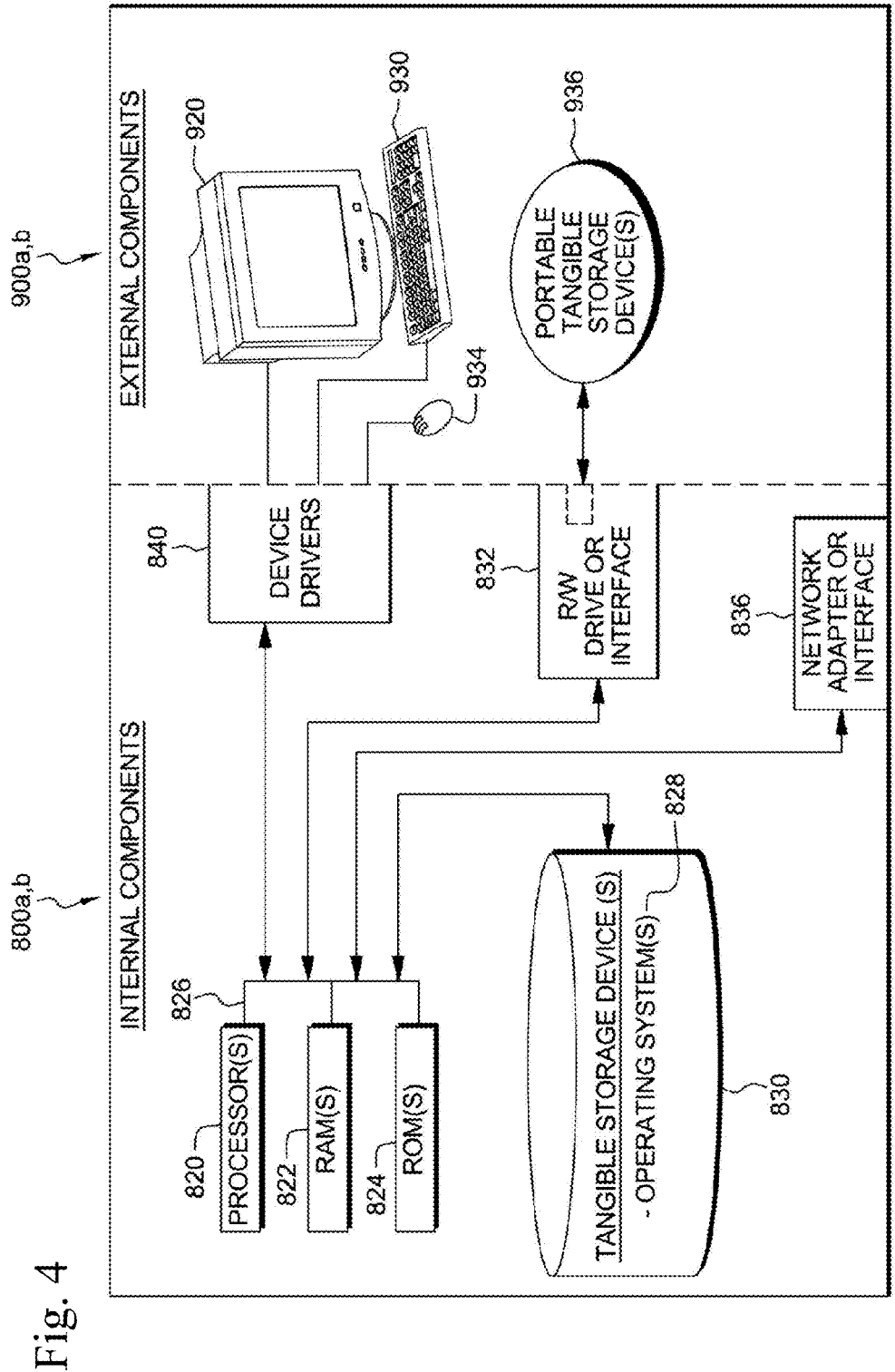
FIG. 4 illustrates internal and external components of a client computer and a server computer in which illustrative embodiments may be implemented.

Client computer 52 includes a set of internal components 800a and a set of external components 900a, further illustrated in FIG. 4. Client computer 52 may be, for example, a mobile device, a cell phone, a personal digital assistant, a netbook, a laptop computer, a tablet computer, a global positioning system (GPS), a desktop computer, or any other type of computing device.

Client computer 52 may contain an interface. Through interface, users may view alternate proposed routes and/or view and participate in social media. Interface may accept commands and data entry from a user, such as input to social media or acceptance of a proposed alternate route. Interface can be, for example, a command line interface, a graphical user interface (GUI), or a web user interface (WUI).

Server computer 54 includes a set of internal components 800*b* and a set of external components 900*b* illustrated in FIG. 4. Server computer 54 may contain an interface. The interface can be, for example, a command line interface, a graphical user interface (GUI), or a web user interface (WUI) through which access to a social media monitor program 66. Alternatively, the social media monitor program 66 may be on client computer 52.

In the depicted example, server computer 54 provides information, such as boot files, operating system images, and applications to client computer 52. Server computer 54 can compute the information locally or extract the information from other computers on network 50.

Program code and programs such as social media monitor program 66 may be stored on at least one of one or more computer-readable tangible storage devices 830 shown in FIG. 4, on at least one of one or more portable computer-readable tangible storage devices 936 as shown in FIG. 4, or on storage unit 53 connected to network 50, or may be downloaded to a computer, such as client computer 52 or server computer 54, for use. For example, program code and programs such as social media monitor program 66 may be stored on at least one of one or more storage devices 830 on server computer 54 and downloaded to client computer 52 over network 50 for use on client computer 52. Alternatively, server computer 54 can be a web server, and the program code, and programs such as social media monitoring program 66 may be stored on at least one of the one or more storage devices 830 on server computer 54 and accessed on client computer 52. In other exemplary embodiments, the program code, and programs such as social media monitoring program 66 may be stored on at least one of one or more computer-readable storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
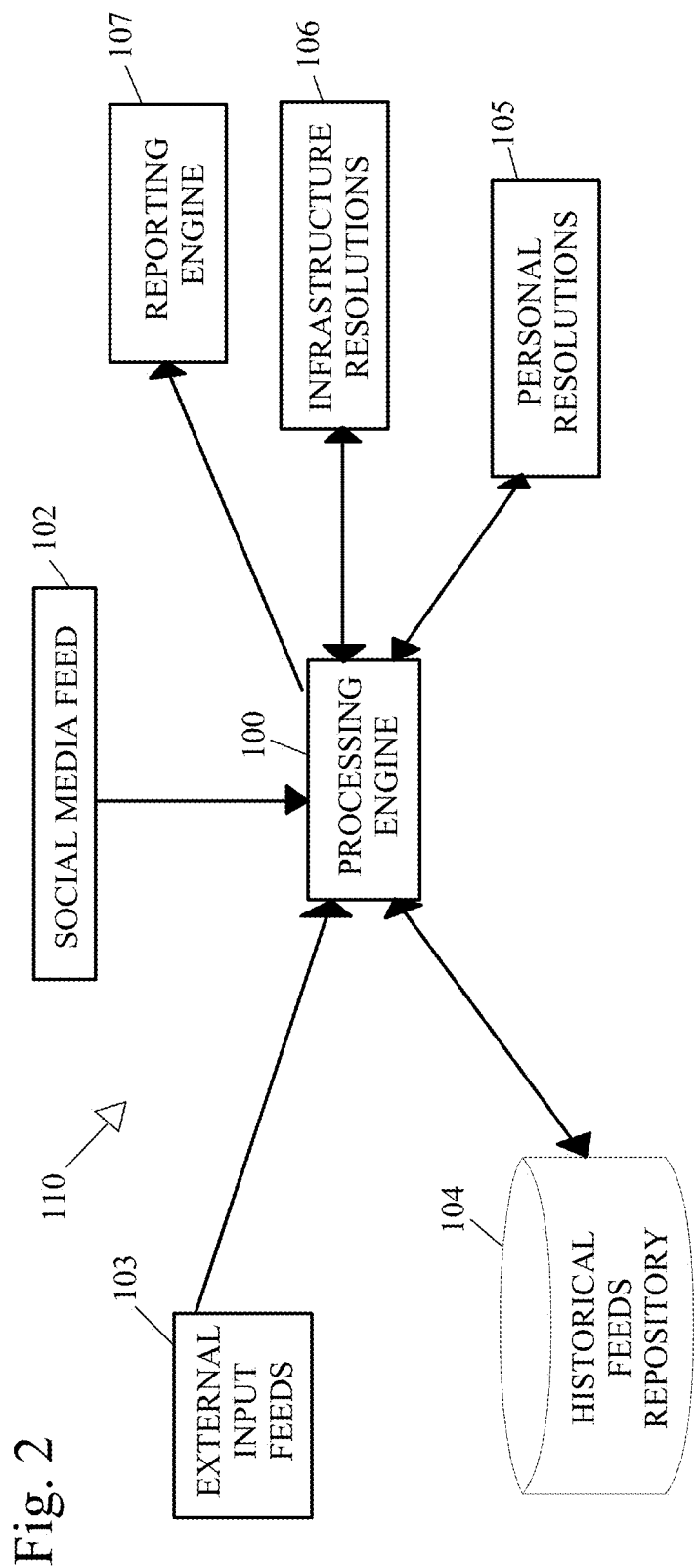
FIG. 2 shows an overview of a social media monitoring system utilizing social media feeds to determine infrastructure and personal resolutions to high traffic events.

FIG. 2 shows an overview of a social media monitoring system utilizing social media feeds to determine infrastructure and personal resolutions to high traffic events. A high traffic event may be any event which hinders the movement of traffic.

The social media monitoring system 110 preferably includes a processing engine 100 which receives an input of a social media feed 102, external input feeds 103, and historical feeds from a historical feeds repository 104. The processing engine 100 uses the inputs to determine and output infrastructure resolutions 106 and personal resolutions 105 which are reported to users through a reporting engine 107. The personal resolutions are resolutions to a high traffic event that an individual user can choose to use to avoid or aid with a high traffic event. An infrastructure resolution is a resolution that alters infrastructure such as roads, lights, etc. . . . . . The success of an infrastructure modification 106 and personal resolutions 105 may be provided as input to the historical feeds repository 104, for example through the processing engine 100.

The social media feed 102 includes non-personal data aggregated from multiple social media feeds, such that trending of events in a geographic location may be identified. The events are preferably events which require travel by users to reach the destination.

The external input feeds 103 are external feeds including, but not limited to, current weather patterns, traffic, time of day, events for a geographic region, delays and other information that can be analyzed in conjunction with the social media feed 102. For example, an event identified within the social media feed at a location with a traffic accident may increase the priority of finding a personal and/or infrastructure resolutions.

The historical feeds repository 104 is a repository with historical data providing information regarding what solutions work for resolving traffic events. The historical feeds repository 104 also receives personal and infrastructure resolutions chosen to respond to traffic events.

The processing engine 100 receives the inputs of the social media feed 102, external input feeds 103, and the historical feeds from the historical feeds repository 104 and performs analytics to prioritize a set of infrastructure resolutions and personal resolutions to aid a user relative to a traffic event. The processing engine preferably includes the social media monitor program 66 and the social media monitoring system 110 may be present on the server computer 54 of FIG. 1.

Infrastructure resolutions 106 include, but are not limited to traffic light timing, extra lane modifications, traffic management etc. . . . . .

Personal resolutions 105 include but are not limited to alternate routes, alternate start times, SMS notifications to alter a route, and modifying the mode of transport (e.g. taking mass transit vs a taxi). The personal resolutions may be provided through a GPS route navigation system.

The reporting engine 107 sends determined personal resolutions to a user. The reporting engine may be part of a GPS system. The determined personal resolutions may also be sent to a user via short message service (SMS), multimedia service (MMS), or other electronic means.

Figure 3B:
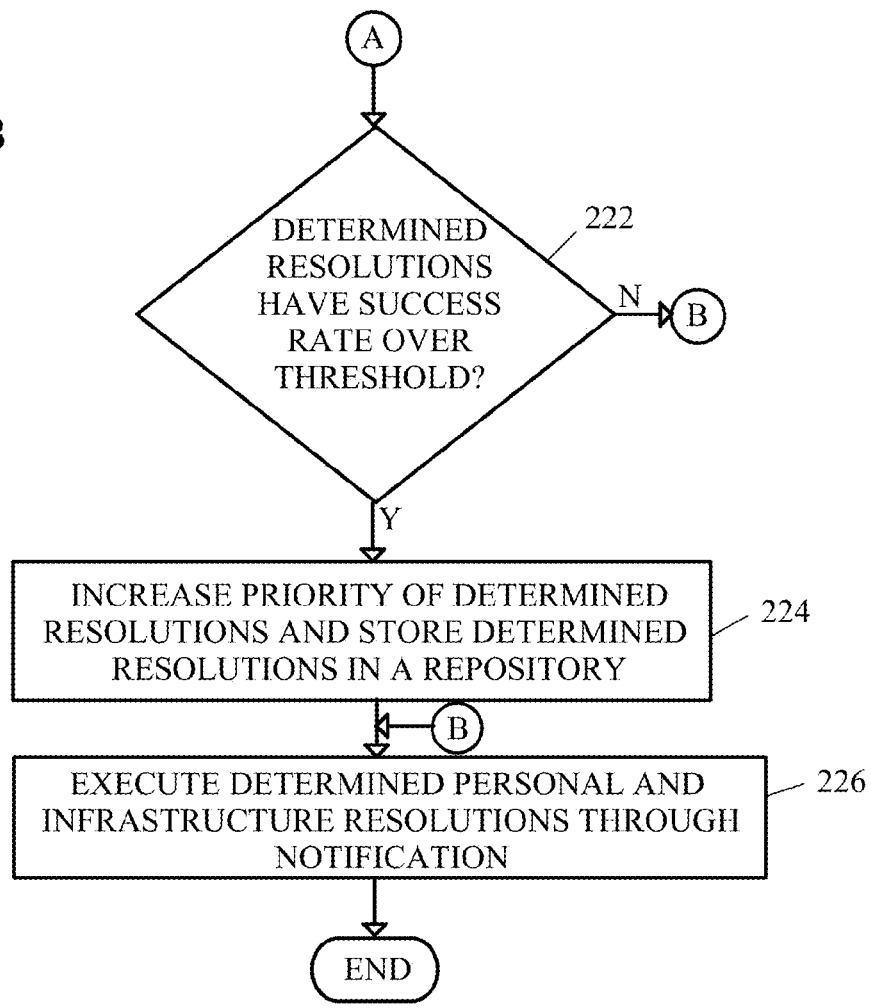

FIGS. 3A-3B shows a flow diagram of a method of utilizing social media feeds to determine infrastructure and personal resolutions to high traffic events via the social media monitoring system.

In a first step, at least one social media feed is received (step 202), for example social media feeds 102. Social media feeds may be any social network in which users exchange or can post topics for discussion.

The social media feed received is filtered to retrieve key words and repetitive language to correlate social trends in a geographic area with high traffic events (step 204), for example by the social media monitor program 66. Example of key words and repetitive language may be language relating to location, people, events or other objects.

The filtered key words are then prioritized as objects with objects with the highest frequency receiving the highest priority (step 206).

A weight is assigned to objects of the prioritized list based on external data feeds (step 208), for example external input feeds 103. Examples of external data feeds may include, but is not limited to current weather patterns, traffic, time of day, events, delays and any other information that can be analyzed with social media information. One example would be a social media event at a location with a traffic accident may escalate a higher priority for an infrastructure or personal resolution.

The list of weighted objects is then analyzed to see what weighted objects can be linked together (step 210). The analysis may use known techniques, such as natural language processing techniques to extract a relevance of text to certain topics, for example Latent Semantic Analysis. For example, two pieces of information may be "I am driving my car to Leeds" and "The Leeds Festival will be great".

The objects which can be linked are cross referenced with external feeds to link two or more disparate events (step 212), for example by the social media monitor program 66. For example, linking events such as "Madison Square Garden" and "Heavy Traffic on 34th Street".

Based on the linked objects, popular social trends from the social media feeds (weighted objects) are correlated with high traffic events (step 214), for example by the social media monitor program 66.

An infrastructure resolution is determined for the high traffic event detected from the social feed and stored in a repository (step 216). An infrastructure resolution is determined by an individual analysis of known infrastructure resolution. The known infrastructure resolutions may be stored in a repository.

A personal resolution to the high traffic event is determined for the high traffic event detected from the social feed and stored in a repository (step 218). A personal resolution is determined by an individual analysis of known personal resolutions.

The determined resolutions are compared to historical resolutions to determine a success rate of the determined resolutions to decrease the high traffic event (step 220). The historical resolutions may be provided by the historical feed stored in a historical feeds repository 104. For example, if the analysis or simulation of the determined resolution A achieves an expected improvement that is greater than determined resolution B, C, etc. then determined resolution A is given as the suggested option.

If a determined resolution has a success rate over a predetermined threshold (step 222), the priority of the determined resolution is increased (step 224).

If a determined resolution does not have a success rate over a predetermined threshold (step 222), the method proceeds to step 226.

The determined personal resolution and infrastructure resolutions are communicated to at least one external user (step 226), for example through the reporting engine 107. The external user may be a government agency or any agency which is involved in regulated traffic. The external user may also include the users which are attending or going to be near the event.

The historical feed stored in the historical feeds repository 104 is updated with the executed personal and infrastructure resolutions relative to high traffic events and the method ends.

In an example, a social media feed is received and filtered for key words, such as "sporting event", "Ralph Wilson Stadium", "tailgate", and "9 AM" may be correlated to Buffalo, N.Y. The key words are then prioritized as objects, with the objects with the highest frequency being assigned the highest priority such as tailgate and 9 AM. A weight is then assigned to the objects based on weather, traffic events, etc. . . . . The weighted objects are then analyzed to see what can be linked together such as "Tailgating with large spread at 9 AM", and "Sporting Event at Ralph Wilson Stadium with Tailgating". The linked objects are then cross-references with external feeds, to link two or more disparate events, for example "Heavy Traffic in Orchard Park" and "Ralph Wilson Stadium". An infrastructure resolution is determined for the high traffic event at Ralph Wilson Stadium, for example altering the traffic lights within Orchard Park to allow better traffic flow into the Ralph Wilson Stadium. A personal resolution is then determined, such as suggesting taking mass transit to attendees. The personal resolution of taking mass transit and altering the traffic light timing is compared to historical resolutions for other large sporting events at the Ralph Wilson Stadium. Since the determined resolutions have a success rate over a predetermined threshold, the priority of the determined resolutions are increased and are communicated to the Transportation Department in Buffalo, N.Y.

FIG. 4 illustrates internal and external components of client computer 52 and server computer 54 in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, social media monitor program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Social media monitor program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Social media monitor program 66 can be downloaded to client computer 52 and server computer 54 from an external computer via a network (for example, the Internet, a local area network or other, wide area network) and network adapter or interface 836. From the network adapter or interface 836, social media monitor program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Social media monitor program 66 can be written in various programming languages including low-level, high-level, object-oriented or non object-oriented languages. Alternatively, the functions of social media monitor program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of utilizing received social media feeds to determine infrastructure and personal resolutions to high traffic events comprising the steps of:
   a computer filtering social media feeds to retrieve keywords and repetitive language to correlate social trends in a geographic area with a high traffic event;
   the computer prioritizing the filtered keywords and repetitive language as objects into a list based on a frequency of occurrence of the filtered keywords and repetitive language in the social media feeds;
   the computer assigning a weight to the objects on the list based on external feeds;
   the computer determining at least one resolution to the high traffic event, selected from a group consisting of an infrastructure resolution and a personal resolution;
   the computer comparing the at least one determined resolution to historical resolutions to determine a success rate of the at least one determined resolution relative to the high traffic event; and if the determined success rate is greater than a threshold, the computer increasing a priority of the at least one determined resolution; and
   the computer communicating the at least one determined resolution to the high traffic event to an external user.

2. The method of claim 1, further comprising the step of the computer updating a historical feed with executed resolutions.

3. The method of claim 1, further comprising the step of the computer analyzing the list for objects which can be linked.

4. The method of claim 3, wherein after the step of the computer analyzing the list for objects which can be linked, further comprising the step of the computer cross referencing the linked objects to external feeds to find links between two or more apparently disparate events.

5. A computer program product for utilizing received social media feeds to determine infrastructure and personal resolutions to high traffic events, the computer program product utilizing a computer comprising at least one processor, one or more memories and one or more non-transitory computer readable storage media, wherein the computer program product is stored on the one or more non-transitory computer readable storage media as program instructions which are executed by the computer to perform a method comprising:
   filtering, by the computer, social media feeds to retrieve keywords and repetitive language to correlate social trends in a geographic area with a high traffic event;
   prioritizing, by the computer, the filtered keywords and repetitive language as objects into a list based on a frequency of occurrence of the filtered keywords and repetitive language in the social media feeds;
   assigning, by the computer, a weight to the objects on the list based on external feeds;
   determining, by the computer, at least one resolution to the high traffic event, selected from a group consisting of an infrastructure resolution and a personal resolution;
   comparing, by the computer, the at least one determined resolution to historical resolutions to determine a success rate of the at least one determined resolution relative to the high traffic event; and if the determined success rate is greater than a threshold, increasing, by the computer, a priority of the at least one determined resolution; and
   communicating, by the computer, the at least one determined resolution to the high traffic event to an external user.

6. The computer program product of claim 5, further comprising the program instructions of updating, by the computer, a historical feed with executed resolutions.

7. The computer program product of claim 1, further comprising the program instructions of analyzing, by the computer, the list for objects which can be linked.

8. The computer program product of claim 7, wherein after the program instructions of analyzing, by the computer, the list for objects which can be linked, further comprising the program instructions of cross referencing, by the computer, the linked objects to external feeds to find links between two or more apparently disparate events.

9. A computer system for utilizing received social media feeds to determine infrastructure and personal resolutions to high traffic events comprising a computer comprising at least one processor, one or more memories, and one or more non-transitory computer readable storage media storing program instructions executable by the computer to perform a method comprising:
   filtering, by the computer, social media feeds to retrieve keywords and repetitive language to correlate social trends in a geographic area with a high traffic event;
   prioritizing, by the computer, the filtered keywords and repetitive language as objects into a list based on a frequency of occurrence of the filtered keywords and repetitive language in the social media feeds;
   assigning, by the computer, a weight to the objects on the list based on external feeds;
   determining, by the computer, at least one resolution to the high traffic event, selected from a group consisting of an infrastructure resolution and a personal resolution;
   comparing, by the computer, the at least one determined resolution to historical resolutions to determine a success rate of the at least one determined resolution relative to the high traffic event; and if the determined success rate is greater than a threshold, increasing, by the computer, a priority of the at least one determined resolution; and
   communicating, by the computer, the at least one determined resolution to the high traffic event to an external user.

10. The computer system of claim 9, further comprising the program instructions of updating, by the computer, a historical feed with executed resolutions.

11. The computer system of claim 9, further comprising the program instructions of analyzing, by the computer, the list for objects which can be linked.

12. The computer system of claim 11, wherein after the program instructions of analyzing, by the computer, the list for objects which can be linked, further comprising the program instructions of cross referencing, by the computer, the linked objects to external feeds to find links between two or more apparently disparate events.

* * * * *